(12) United States Patent
Misumi et al.

(10) Patent No.: US 11,758,307 B2
(45) Date of Patent: *Sep. 12, 2023

(54) SENSOR DEVICE, BACKGROUND NOISE DATA TRANSMISSION METHOD, AND BACKGROUND NOISE DATA TRANSMISSION PROGRAM

(71) Applicant: OMRON Corporation, Kyoto (JP)

(72) Inventors: Shuichi Misumi, Kyoto (JP); Tetsuji Yamato, Yokohama (JP); Takeshi Naito, Tokyo (JP)

(73) Assignee: OMRON Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/625,804

(22) PCT Filed: Jul. 25, 2018

(86) PCT No.: PCT/JP2018/027823
§ 371 (c)(1),
(2) Date: Dec. 23, 2019

(87) PCT Pub. No.: WO2019/026711
PCT Pub. Date: Feb. 7, 2019

(65) Prior Publication Data
US 2020/0118576 A1    Apr. 16, 2020

(30) Foreign Application Priority Data

Aug. 2, 2017 (JP) ................................. 2017-150106

(51) Int. Cl.
*H04L 43/065* (2022.01)
*H04B 17/19* (2015.01)
(Continued)

(52) U.S. Cl.
CPC ........... *H04Q 9/00* (2013.01); *G05B 19/4184* (2013.01); *H04B 17/19* (2015.01); *H04B 17/26* (2015.01);
(Continued)

(58) Field of Classification Search
None
See application file for complete search history.

(56) References Cited

U.S. PATENT DOCUMENTS

2008/0079827 A1    4/2008  Hoshino et al.
2010/0299083 A1   11/2010  Jiang et al.
(Continued)

FOREIGN PATENT DOCUMENTS

CN    101155256 A    4/2008
CN    101266273 A    9/2008
(Continued)

OTHER PUBLICATIONS

PCT/US17/31721, May 2017, pp. All (Year: 2017).*
(Continued)

*Primary Examiner* — Richa Mishra
(74) *Attorney, Agent, or Firm* — METROLEX IP LAW GROUP, PLLC

(57) ABSTRACT

A sensor device transmits, to an external device installed external to the sensor device, sensing data generated from monitoring a target, and includes a sensor unit that generates sensing data including background noise data. The background noise data represents noise from a cause other than the target. The sensor device further includes an extraction unit that extracts the background noise data from the sensing data, and a transmission unit that transmits the background noise data extracted by the extraction unit to the external device.

4 Claims, 14 Drawing Sheets

(51) Int. Cl.
*H04B 17/26* (2015.01)
*H04L 67/12* (2022.01)
*H04Q 9/00* (2006.01)
*H04Q 9/10* (2006.01)
*G05B 19/418* (2006.01)

(52) U.S. Cl.
CPC ............ *H04L 43/065* (2013.01); *H04L 67/12* (2013.01); *H04Q 9/10* (2013.01); *G05B 2219/34294* (2013.01)

(56) References Cited

U.S. PATENT DOCUMENTS

| 2012/0166188 | A1* | 6/2012 | Chakra ............... G10L 21/0208 704/226 |
| 2014/0372561 | A1 | 12/2014 | Hisano |
| 2015/0006115 | A1 | 1/2015 | Svoboda et al. |
| 2015/0130652 | A1* | 5/2015 | Sugino .................... G01S 7/417 342/27 |
| 2015/0244952 | A1 | 8/2015 | Tani et al. |
| 2016/0320360 | A1 | 11/2016 | Wang et al. |
| 2017/0094716 | A1* | 3/2017 | Pogorelik ............... H04L 67/12 |
| 2017/0163439 | A1* | 6/2017 | Bosua .................... H04W 76/11 |
| 2018/0144418 | A1* | 5/2018 | Ravid .................. G06Q 20/145 |
| 2018/0284757 | A1* | 10/2018 | Celia ........................ G06N 3/02 |
| 2018/0373956 | A1 | 12/2018 | Yamato |
| 2019/0130926 | A1* | 5/2019 | Giri ...................... H04R 25/505 |

FOREIGN PATENT DOCUMENTS

| CN | 102324034 | A | 1/2012 |
| CN | 106233723 | A | 12/2016 |
| JP | 4928612 | B2 | 5/2012 |
| JP | 5445722 | B1 | 3/2014 |
| JP | 2016-211838 | A | 12/2016 |
| WO | 2016/076072 | A1 | 5/2016 |
| WO | 2017/104287 | A1 | 6/2017 |

OTHER PUBLICATIONS

The Office Action (CNOA) dated Sep. 22, 2020 in a counterpart Chinese patent application.
Extended European search report (EESR) dated Jan. 13, 2021 in a counterpart European patent application.
The International Search Report ("ISR") of PCT/JP2018/027823 dated Sep. 4, 2018.
The Written Opinion ("WO") of PCT/JP2018/027823 dated Sep. 4, 2018.
The Office Action dated Jul. 14, 2021 for the counterpart Chinese patent application, with English translation.

* cited by examiner

SENSOR DEVICE, BACKGROUND NOISE DATA TRANSMISSION METHOD, AND BACKGROUND NOISE DATA TRANSMISSION PROGRAM

FIELD

The present invention relates to a technique for distributing sensing data between a provider and a user.

BACKGROUND

A sensor network system has been developed to distribute sensing data sensed by sensor devices between a provider and a user (refer to, for example, Patent Literature 1). Each sensor device herein is a sensor, or a device connectable to multiple sensors. The sensing data represents the measurement characteristics for a measurement target sensed by a sensor device. Measurement targets include abstract objects representing real-world phenomena (e.g., persons, objects, and events). The measurement characteristics refer to the attributes of a measurement target to be monitored by a sensor. The measurement target is, for example, an environment. The measurement characteristics for the environment include temperature, humidity, atmospheric pressure, sound pressure, illuminance, ultraviolet rays, and acceleration.

A provider registers, with a network server, a sensor device, and also sensor metadata about sensing data to be sensed and provided by the sensor device. A user registers, with the network server, an application that uses sensing data, and also application metadata about sensing data to be used by the application. The sensor metadata is information about a sensor, and also about the attributes of sensing data obtained by the sensor. The application metadata is information about an application, and also about the attributes of sensing data to be used by the application.

The network server performs matching using the sensor metadata and the application metadata, and retrieves a sensor device that provides sensing data satisfying a request from the application. The network server transmits a data flow control command to a sensor management unit that manages the retrieved sensor device. The data flow control command causes a data provider (sensor device) to distribute sensing data to a data user (application).

CITATION LIST

Patent Literature

Patent Literature 1: Japanese Patent No. 5445722

SUMMARY

Technical Problem

A known sensor device for sensing the measurement characteristics for an environment is installed at a predetermined position to unidirectionally transmit sensing data. The state of the sensor device is unknown to the user. For example, the user receives sensing data obtained through sensing by the sensor device although the sensor device has dropped from the installation position and is sensing the measurement characteristics for an environment different from the installation position. This state of the sensor device is unknown to the user. Thus, unreliable sensing data may be distributed between the provider and the user.

One or more aspects of the present invention are directed to a technique for providing data for obtaining an index of reliability of sensing data.

Solution to Problem

A sensor device according to one aspect of the present invention transmits, to an external device installed external to the sensor device, sensing data generated from monitoring a target. The sensor device includes a sensor unit that generates sensing data including background noise data representing noise from a cause other than the target, an extraction unit that extracts the background noise data from the sensing data, and a transmission unit that transmits the background noise data extracted by the extraction unit to the external device.

The background noise of the sensor device can vary depending on the state of the sensor device, although it remains unaffected by the characteristics of a measurement target to be monitored. Thus, analyzing the background noise reveals a change in the state of the sensor device, thus providing an index of sensing data reliability. The above structure thus provides data for obtaining an index of sensing data reliability.

The sensor device according to the above aspect may further include a storage that stores the sensing data including items generated at a plurality of times. The transmission unit collectively transmits the items of sensing data stored in the storage to the external device.

The extraction unit may extract the background noise data by sorting items of the sensing data generated at a plurality of times based on values indicated by the sensing data items.

Advantageous Effects

The above aspects of the present invention provide data for determining the reliability of sensing data.

DETAILED DESCRIPTION

One or more embodiments of the present invention will now be described.

Figure 1:
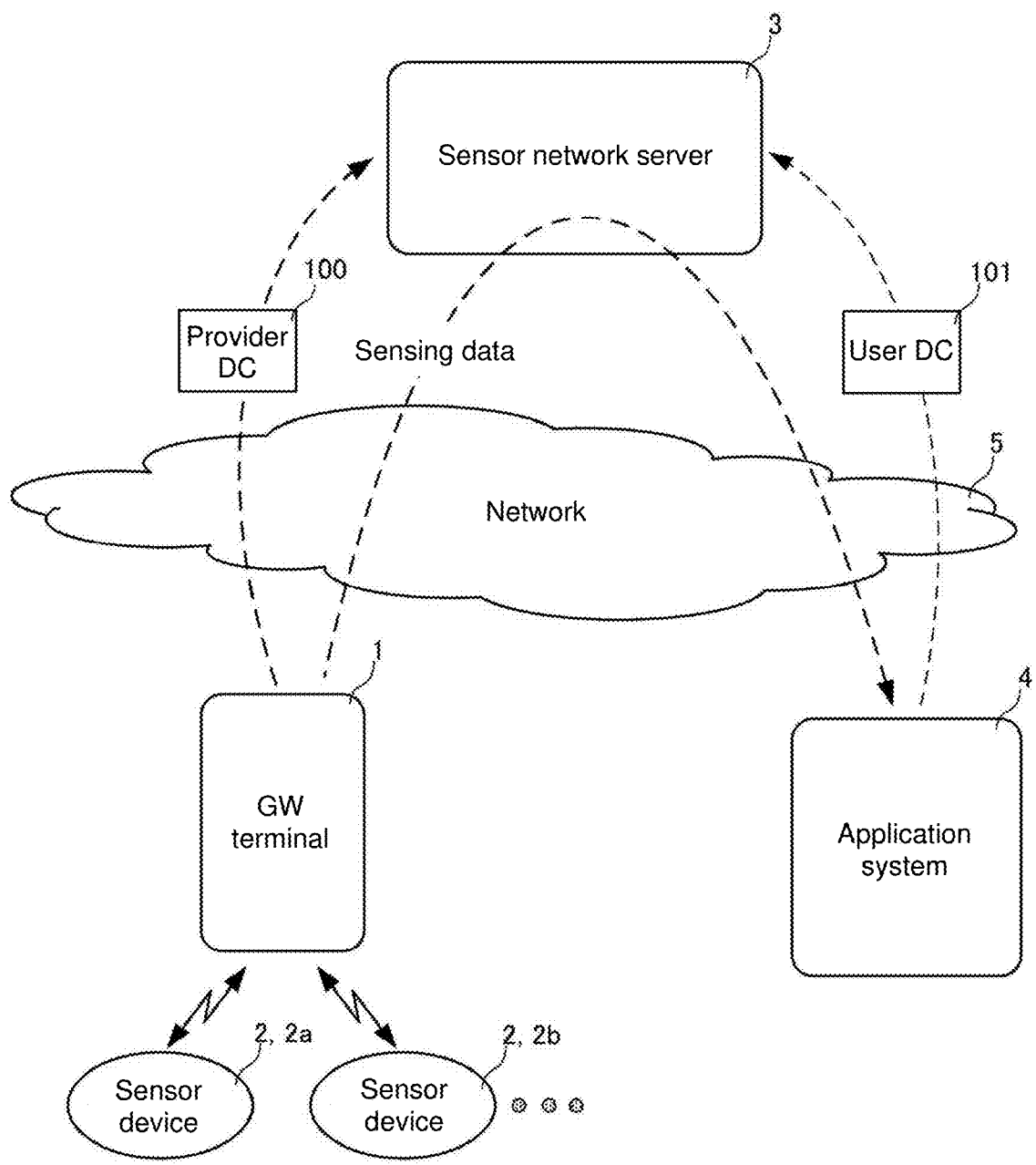
FIG. 1 is a schematic diagram of a sensing data distribution system.

A sensing data distribution system will be described first. FIG. 1 is a schematic diagram of the sensing data distribution system. The sensing data distribution system includes a gateway (GW) terminal 1, sensor devices 2, a sensor network server 3, and an application system 4. The sensing data distribution system distributes sensing data between a provider and a user. The GW terminal 1 corresponds to an external device in an aspect of the present invention. Each sensor device 2 is a sensor, or a device connectable to multiple sensors. To distinguish between multiple sensor devices 2, the sensor devices 2 may be referred to as a sensor device 2a and a sensor device 2b.

The GW terminal 1 and the sensor devices 2 are components of the provider providing sensing data. The application system 4 is a component of the user using sensing data. The sensor network server 3 defines a sensing data distribution market that serves as a marketplace for distributing sensing data on the Internet, or specifically a sensing data trading market (SDTM).

The provider transmits a provider data catalog 100 (provider DC 100), which is associated with sensing data to be traded (to sell) in the SDTM, and registers the provider data catalog 100 with the sensor network server 3. The provider data catalog 100 stores attribute information about sensing data to be provided.

The user transmits a user data catalog 101 (user DC 101), which is associated with sensing data to be traded (to purchase) in the SDTM, and registers the user data catalog 101 with the sensor network server 3. The user data catalog 101 stores attribute information about sensing data to be used.

The sensor network server 3 performs matching for retrieving a provider that provides sensing data satisfying the user data catalog 101 based on the registered provider data catalog 100 and the user data catalog 101.

The provider transmits sensing data to the user in response to a data flow control command resulting from the matching. The data flow control command is generated by any of devices including the sensor network server 3, the provider, and the user in accordance with the matching result. In other words, the data flow control command may be generated by any device.

The sensor network server 3 is connectable to multiple providers (the GW terminal 1 and the sensor devices 2) with a network 5. The sensor network server 3 is connectable to multiple users (application systems 4) with the network 5. FIG. 1 shows a single provider and a single user. Sensing data may be transmitted from the provider to the user through the sensor network server 3 as shown in FIG. 1, or may be transmitted from the provider to the user directly without using the sensor network server 3.

Figure 2:
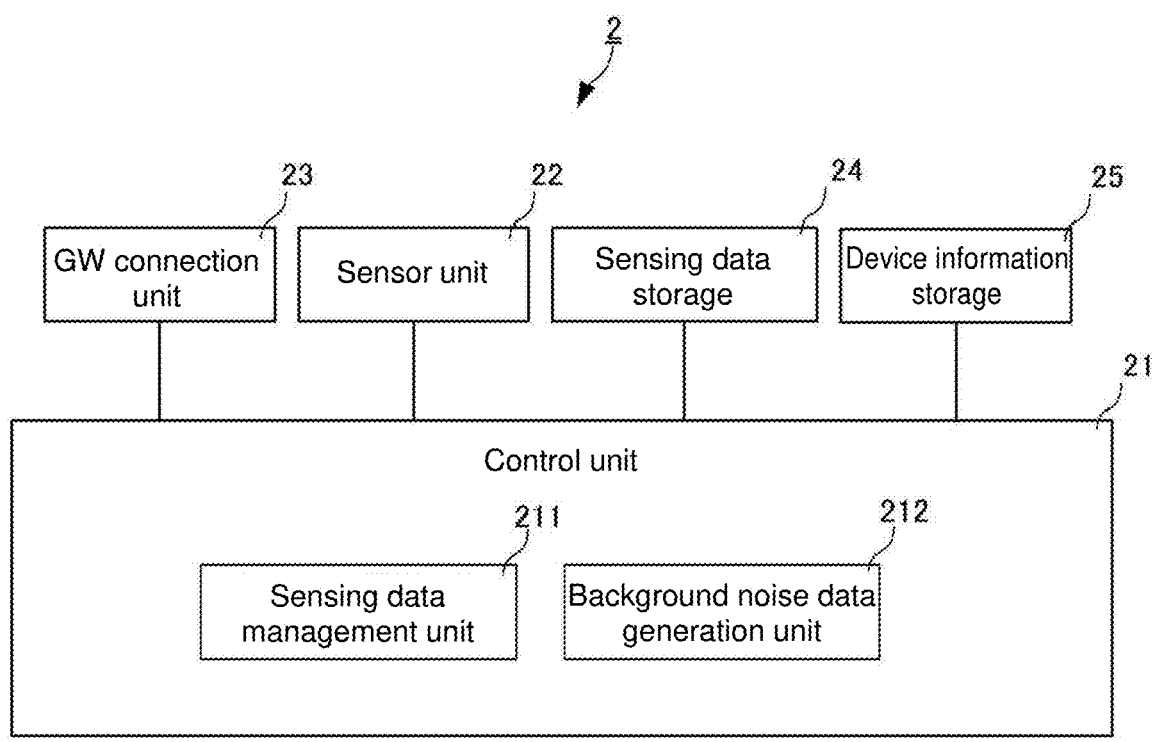
FIG. 2 is a block diagram of a sensor device 2 showing its main components.

FIG. 2 is a block diagram of the sensor device 2 showing its main components. The sensor device 2 includes a control unit 21, a sensor unit 22, a gateway (GW) connection unit 23, a sensing data storage 24, and a device information storage 25. The sensor device 2 may be an environmental sensor that measures, for example, temperature, humidity, atmospheric pressure, sound pressure, illuminance, ultraviolet rays, and acceleration at its installation position, or may be any other sensor. The sensor device 2 may sense a single measurement characteristic or multiple measurement characteristics.

The sensor unit 22 includes a sensor that senses the measurement characteristics for a measurement target. The sensor unit 22 may include a single sensor or multiple sensors. The GW connection unit 23 connects the GW terminal 1 with wires or wirelessly. The GW connection unit 23 functions as an interface for controlling input and output of data with the GW terminal 1. The sensing data storage 24 stores sensing data output by the sensor unit 22. The sensing data storage 24 stores pieces of sensing data sensed at multiple times.

The device information storage 25 stores device information. The device information is about a sensor device (e.g., a device model, a device identifier, and set values in a device). The device model indicates the model of a device. The device identifier is a code for identifying each device uniquely set at the shipment from the factory. The set values in a device are parameters regulating, for example, the operation of the device or signals to be input or output.

The control unit 21 controls the operation of each main component of the sensor device 2. The control unit 21 includes a sensing data management unit 211 and a background noise data generation unit 212 as shown in FIG. 2. The sensing data management unit 211 corresponds to a transmission unit (transmits sensing data to an external device) in an aspect of the present invention. The background noise data generation unit 212 corresponds to an extraction unit and a transmission unit (transmits background noise data to an external device) in an aspect of the present invention.

The sensing data management unit 211 obtains sensing data through the sensor unit 22 at predetermined intervals, and stores the sensing data into the sensing data storage 24. The sensing data management unit 211 transmits, to the GW terminal 1, data including untransmitted sensing data stored in the sensing data storage 24 and a device identifier obtained from the device information storage 25 at predetermined intervals. In other words, the sensing data management unit 211 collectively transmits sensing data stored in the sensing data storage 24 to the GW terminal 1. The sensing data management unit 211 deletes, at predetermined intervals, sensing data other than sensing data sensed in a predetermined past period up to the present time from the sensing data storage 24.

The background noise data generation unit 212 extracts background noise data reflecting background noise based on sensing data obtained through sensing by the sensor unit 22 at predetermined intervals. Background noise is information obtained through sensing excluding information to be monitored. In other words, background noise data represents noise from a cause other than a measurement target. For example, background noise data includes data about noise that can occur inside the sensor device 2 when the sensor device 2 is on, and noise data generated in the surrounding environment of the sensor device 2. The background noise data generation unit 212 transmits, to the GW terminal 1, data including the generated background noise data and a device identifier obtained from the device information storage 25.

The sensing data management unit 211 may transmit sensing data to the GW terminal 1 upon every reception of the data from the sensor unit 22, instead of collectively transmitting sensing data stored in the sensing data storage 24 to the GW terminal 1. The background noise data generation unit 212 may generate background noise data in response to a request from the GW terminal 1. Sensing data may be transmitted at the same time as or at a time different from when background noise data is transmitted.

The control unit 21 in the sensor device 2 includes a hardware central processing unit (CPU), a memory, and other electronic circuits. The hardware CPU functions as the sensing data management unit 211 and the background noise data generation unit 212 described above. The memory has an area for expanding a sensing data provision program according to one or more embodiments of the present invention and an area for temporarily storing data generated by executing the sensing data provision program. The control unit 21 may be a large scale integrated circuit (LSI) integrating, for example, a hardware CPU and a memory.

Figure 3:
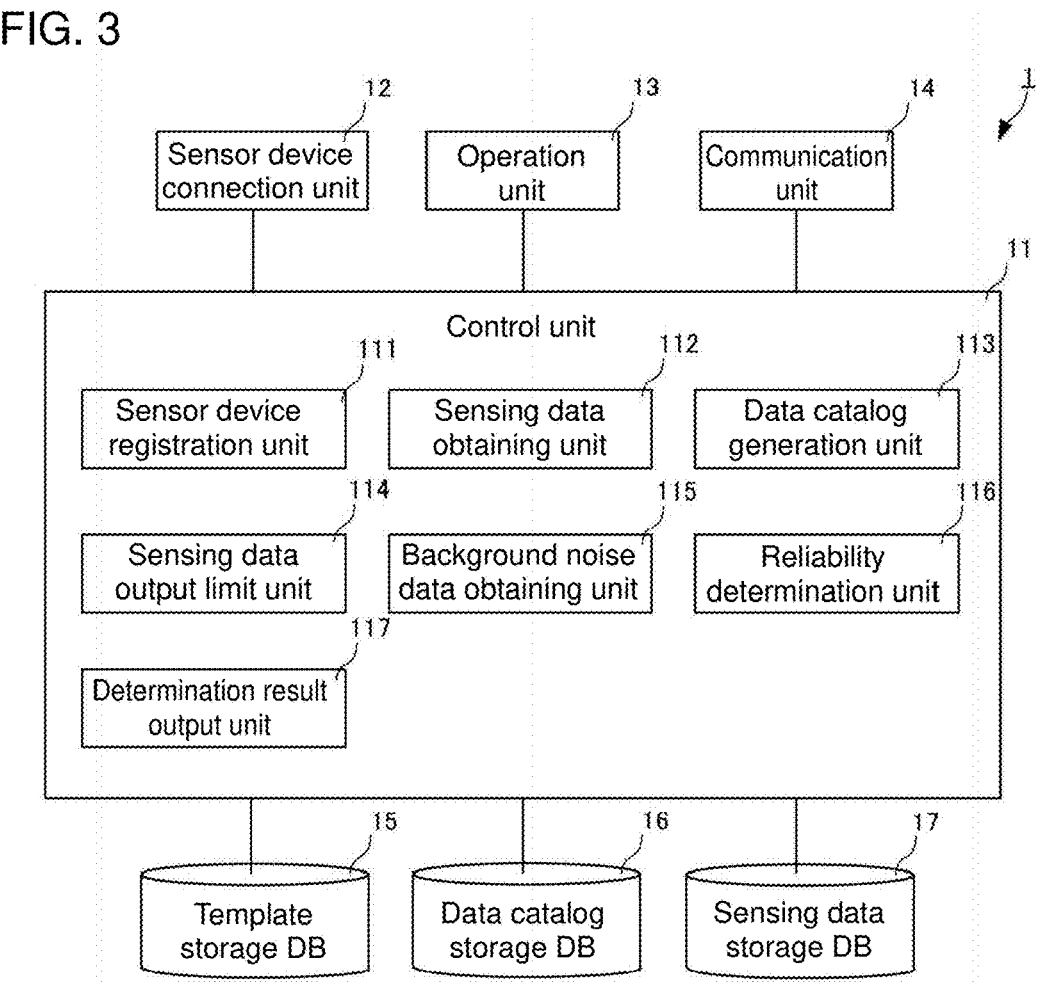
FIG. 3 is a block diagram of a gateway (GW) terminal 1 showing its main components.

FIG. 3 is a block diagram of the GW terminal 1 showing its main components. The GW terminal 1 includes a control unit 11, a sensor device connection unit 12, an operation unit 13, a communication unit 14, a template storage database 15 (template storage DB 15), a data catalog storage database 16 (data catalog storage DB 16), and a sensing data storage database 17 (sensing data storage DB 17). The GW terminal 1 may be a personal computer (PC) or a mobile terminal such as a smartphone or a tablet, or may be any other information processing device. The GW terminal 1 is a smartphone in this embodiment.

The control unit 11 controls the operation of each main component of the GW terminal 1. As shown in FIG. 3, the control unit 11 includes a sensor device registration unit 111, a sensing data obtaining unit 112, a data catalog generation unit 113, a sensing data output limit unit 114, a background noise data obtaining unit 115, a reliability determination unit 116, and a determination result output unit 117. The sensor device registration unit 111, the sensing data obtaining unit 112, the data catalog generation unit 113, the sensing data output limit unit 114, the background noise data obtaining unit 115, the reliability determination unit 116, and the determination result output unit 117 included in the control unit 11 will be described later in detail.

The sensor device connection unit 12 connects the sensor device 2 with wires or wirelessly. The sensor device connection unit 12 functions as an interface for controlling input and output of data with the sensor device 2.

The operation unit 13 receives an input operation performed by an operator operating the GW terminal 1. In this embodiment, the operation unit 13 includes a display and a touch panel attached to the screen of the display. The operation unit 13 also controls screens to appear on the display (e.g., screens to be a user interface).

The communication unit 14 controls data communications with an external device with the network 5. The sensor network server 3 and the application system 4 shown in FIG. 1 each correspond to the external device herein. The external device is not limited to the sensor network server 3 and the application system 4.

Figure 4:
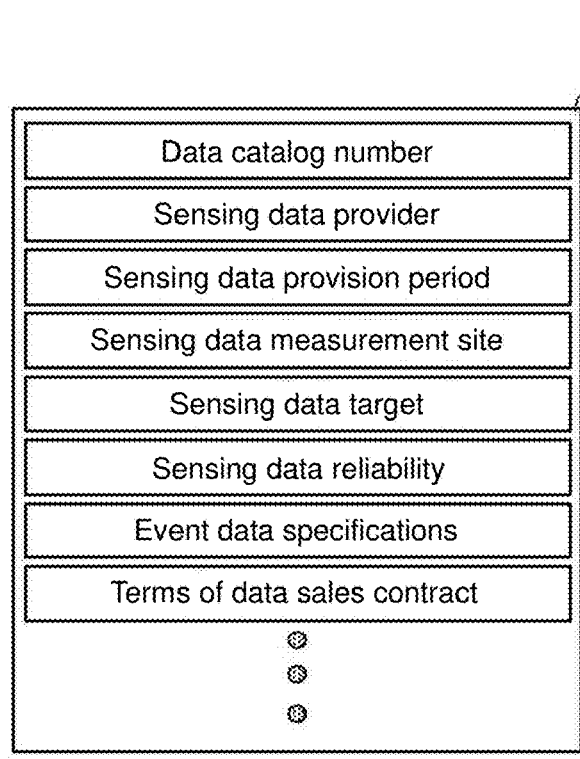
FIG. 4 is a schematic diagram of a provider data catalog 100.

The template storage DB 15 stores a template for the provider data catalog 100. The provider data catalog 100 will now be described. FIG. 4 is a schematic diagram of the provider data catalog 100.

The provider data catalog 100 mainly includes a data catalog number, a sensing data provider, a sensing data provision period, a sensing data measurement site, a sensing data target, sensing data reliability, event data specifications, and the terms of a data sales contract. The data catalog number identifies the provider data catalog 100. The sensing data provider is attribute information associated with an organization (an individual or a business entity) that provides sensing data. The sensing data provision period is attribute information associated with a period for providing sensing data. The sensing data measurement site is attribute information associated with a site at which the measurement target is sensed. The sensing data target is attribute information associated with a measurement target and measurement characteristics. The reliability of sensing data is attribute information associated with the reliability of sensing data. The event data specifications are attribute information associated with event conditions. The terms of the data sales contract are attribute information associated with the sensing data trading.

The provider data catalog 100 may include a static data catalog including static attribute information that remains unchanged upon every sensing, and a dynamic data catalog including dynamic attribute information that may change upon every sensing. Static attribute information includes information about the sensing data provider. Dynamic attribute information include information about the reliability of sensing data.

The data catalog storage DB 16 is used to store the provider data catalog 100. The data catalog storage DB 16 stores at least the provider data catalog 100 registered with the sensor network server 3. In other words, the provider data catalog 100 registered with the sensor network server 3 is stored in the data catalog storage DB 16.

The provider data catalog 100 stored in the data catalog storage DB 16 may remain unregistered with the sensor network server 3.

The sensing data storage DB 17 stores sensing data about the measurement characteristics for a measurement target sensed by the sensor device 2.

Any two or more of the template storage DB 15, the data catalog storage DB 16, and the sensing data storage DB 17 described above may be combined and integrated. For example, the template storage DB 15 and the data catalog storage DB 16 may be integrated into one database, or the template storage DB 15, the data catalog storage DB16, and the sensing data storage DB 17 may be integrated into one database.

The sensor device registration unit 111, the sensing data obtaining unit 112, the data catalog generation unit 113, the sensing data output limit unit 114, the background noise data obtaining unit 115, the reliability determination unit 116, and the determination result output unit 117 included in the control unit 11 will now be described.

The sensor device registration unit 111 registers the device identifier of the sensor device 2 with the GW terminal 1. The GW terminal 1 can register multiple sensor devices 2. The GW terminal 1 cannot be used to trade sensing data sensed by an unregistered sensor device 2 in the SDTM. In other words, only sensing data sensed by sensor devices 2 registered with the GW terminal 1 can be traded in the SDTM.

The provider can choose not to trade sensing data sensed by a sensor device 2 registered with the GW terminal 1 in the SDTM.

The sensing data obtaining unit 112 obtains sensing data sensed by a sensor device 2 from the sensor device 2 connected through the sensor device connection unit 12. The sensing data obtaining unit 112 stores the obtained sensing data into the sensing data storage DB 17.

The data catalog generation unit 113 generates the provider data catalog 100 to be registered with the sensor network server 3. The data catalog generation unit 113 generates the provider data catalog 100 using a template for the provider data catalog 100 stored in the template storage DB 15. The data catalog generation unit 113 receives an editing operation performed by the operator (provider), and generates the provider data catalog 100. The operator edits the provider data catalog 100 by operating the operation unit 13.

The sensing data output limit unit 114 filters and classifies sensing data sensed by the sensor device 2 and obtained by the sensing data obtaining unit 112. Through filtering, the sensing data is classified into data items allowed to be transmitted to an external device (user) through the communication unit 14, and data items not allowed to be transmitted to the external device.

The background noise data obtaining unit 115 obtains (receives) background noise data from the sensor device 2 connected through the sensor device connection unit 12. More specifically, the background noise data obtaining unit 115 obtains background noise data reflecting background noise included in sensing data sensed by the sensor device 2. The background noise data obtaining unit 115 transmits the obtained background noise data to the reliability determination unit 116.

The reliability determination unit 116 determines the reliability of sensing data using the background noise data obtained by the background noise data obtaining unit 115. The reliability determination unit 116 determines the reliability of sensing data by comparing the volume of background noise included in the background noise data with a threshold.

Although the GW terminal 1 determines the reliability of sensing data in this embodiment, the sensor device 2 may determine the reliability of sensing data.

The determination result output unit 117 outputs the result of determination of sensing data reliability performed by the reliability determination unit 116. The determination result output unit 117 updates the reliability of sensing data included in the provider data catalog 100 stored in the data catalog storage DB 16. The determination result output unit 117 transmits the result of determination of sensing data reliability to the sensor network server 3, and updates the reliability of sensing data in the provider data catalog 100 registered with the sensor network server 3.

The determination result output unit 117 may provide a determination result for sensing data reliability to a user when the determination result fails to satisfy a predetermined condition. The determination result output unit 117 may provide the determination result to the user either through or without through the sensor network server 3.

The determination result output unit 117 may update the provider data catalog 100 registered with the sensor network server 3 by transmitting an updated provider data catalog 100 to the sensor network server 3.

When the provider data catalog 100 as an update target is yet to be generated, the determination result output unit 117 may delete a determination result for sensing data reliability, or may store the determination result for use in generating the provider data catalog 100.

When the provider data catalog 100 includes a static data catalog and a dynamic data catalog, the determination result output unit 117 may update the dynamic data catalog alone.

The control unit 11 in the GW terminal 1 includes a hardware CPU, a memory, and other electronic circuits. The hardware CPU functions as the sensor device registration unit 111, the sensing data obtaining unit 112, the data catalog generation unit 113, the sensing data output limit unit 114, the background noise data obtaining unit 115, the reliability determination unit 116, and the determination result output unit 117 described above. The memory has an area for expanding a sensing data provision program according to one or more embodiments of the present invention and an area for temporarily storing data generated by executing the sensing data provision program. The control unit 11 may be an LSI integrating, for example, a hardware CPU and a memory.

Figure 5:
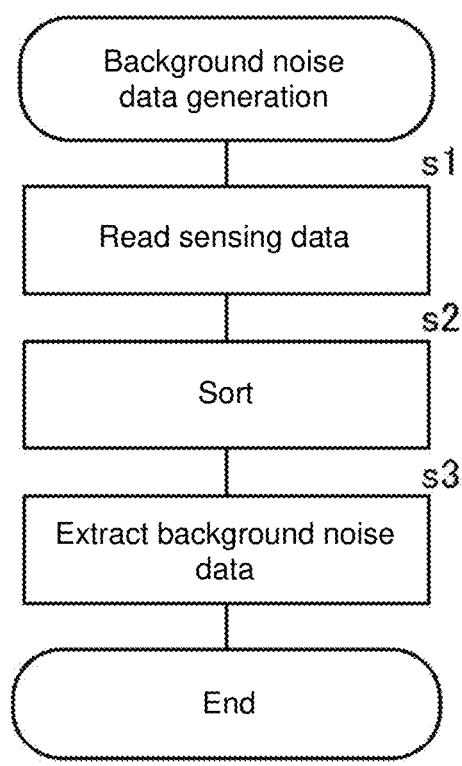
FIG. 5 is a flowchart showing a process for generating background noise data performed by the sensor device 2.

A process for generating background noise data performed by the sensor device 2 will now be described. FIG. 5 is a flowchart showing the process for generating background noise data performed by the sensor device 2 according to this embodiment.

The background noise data generation unit 212 reads, from the sensing data storage 24, N pieces of sensing data obtained by the sensing data management unit 211 in a predetermined past period up to the present time through the sensor unit 22 (s1). In other words, the background noise data generation unit 212 reads, from the sensing data storage 24, time-series data obtained through sensing performed by the sensor unit 22. The number N of pieces of sensing data to be handled by the background noise data generation unit 212 at a time is determined as appropriate.

The background noise data generation unit 212 sorts N pieces of sensing data in ascending order based on values indicated by the sensing data pieces into each sorted array (s2). More specifically, the sensing data management unit 211 sorts sensing data pieces obtained through sensing performed over time based on the values indicated by the sensing data pieces. The algorithm for sorting may be, for example, quicksort. The CPU with relatively slow processing capability used in a sensor device can thus perform rapid sorting.

The background noise data generation unit 212 may sort N pieces of sensing data in descending order based on the values indicated by the sensing data pieces.

Figure 6A:
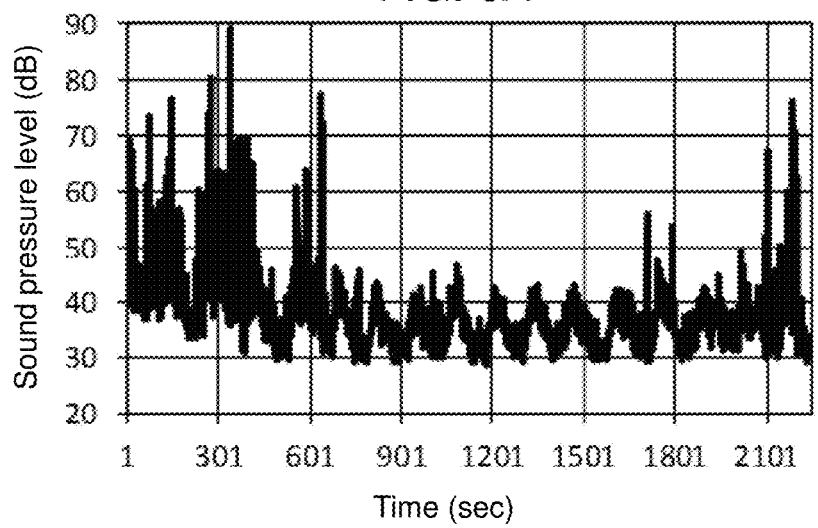
FIGS. 6A, 6B, and 6C are graphs showing example sensing data to be sorted by a background noise data generation unit 212.
Figure 6B:
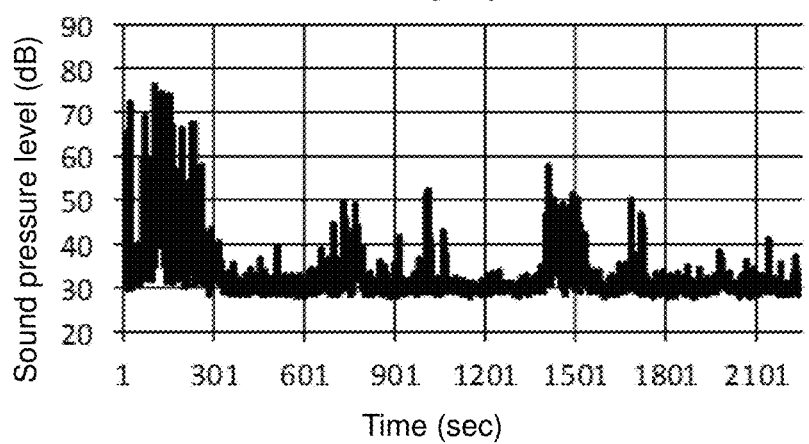
Figure 6C:
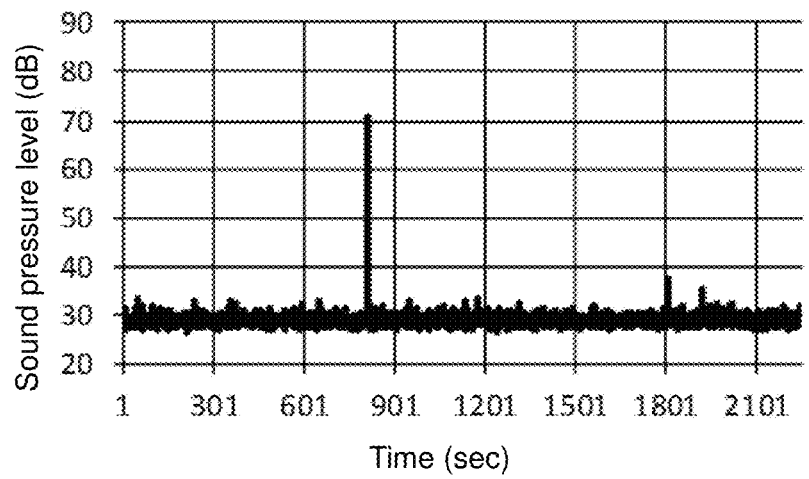

FIGS. 6A, 6B, and 6C show example sensing data pieces to be sorted by the background noise data generation unit 212. FIGS. 6A, 6B, and 6C show sensing data pieces obtained by sensing sound pressure. In FIGS. 6A to 6C, the vertical axis indicates the sound pressure level, and the horizontal axis indicates the time at which the sound pressure level is measured. FIG. 6A shows example sound pressure levels measured at greater background noise than usual. FIG. 6B shows example sound pressure levels measured at less background noise than usual. FIG. 6C shows example sound pressure levels measured with a closed microphone hole.

Figure 7A:
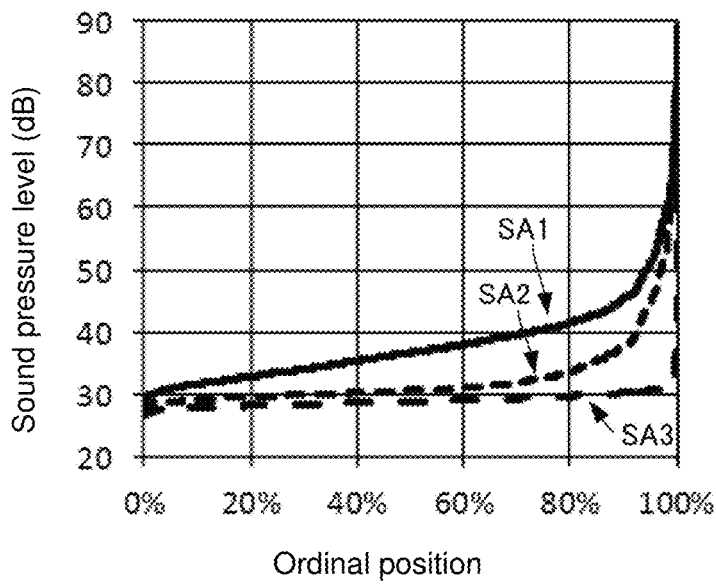
FIGS. 7A to 7C are graphs showing sorted arrays obtained by sorting sensing data in ascending order.
Figure 7B:
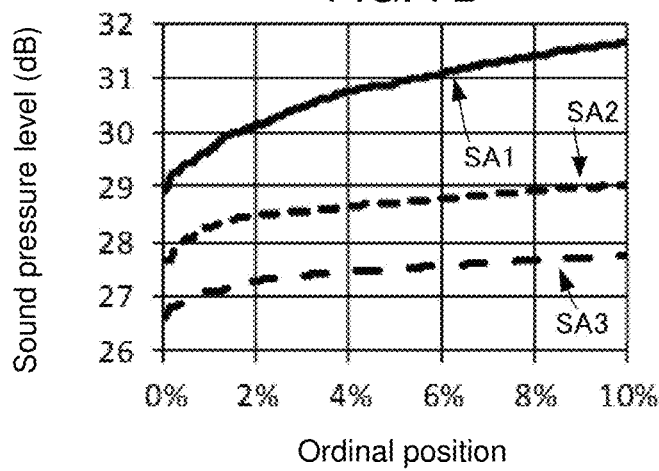
Figure 7C:
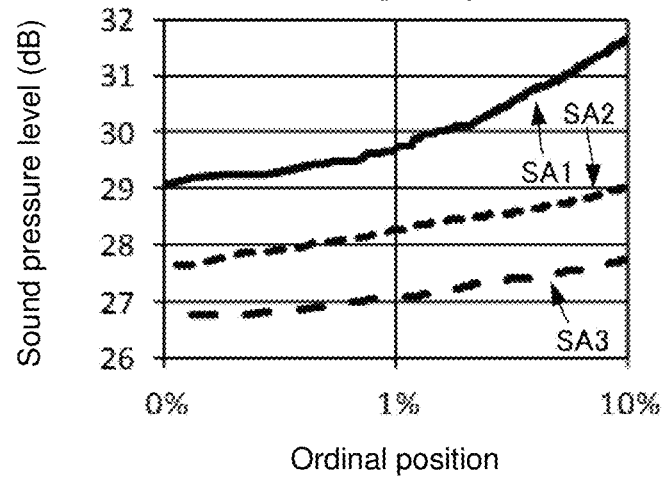

FIGS. 7A, 7B, and 7C show sorted arrays obtained by sorting the sensing data pieces in ascending order. FIGS. 7B and 7C are graph segments representing background noise reflected in the sorted arrays shown in FIG. 7A. The graph in FIG. 7C uses a logarithmic scale for the horizontal axis. In FIGS. 7A to 7C, the vertical axis indicates the sound pressure level (values of elements of a sorted array), and the horizontal axis indicates the position of each element of a sorted array. An element at p % is in the p×N/100th position in a sorted array. In FIGS. 7A to 7C, the sorted arrays SA1, SA2, and SA3 are respectively obtained by sorting the sensing data pieces shown in FIGS. 6A, 6B, and 6C. Element values falling within a range of 0 to 10% in the sorted arrays SA1 to SA3 reflect the features of background noise associated with sound pressure levels shown in FIGS. 6A, 6B, and 6C, and are smaller in the order of the sorted arrays SA1, SA2, and SA3.

In this embodiment, signals associated with sensing data other than those with noticeable behaviors represent background noise.

Figure 8A:
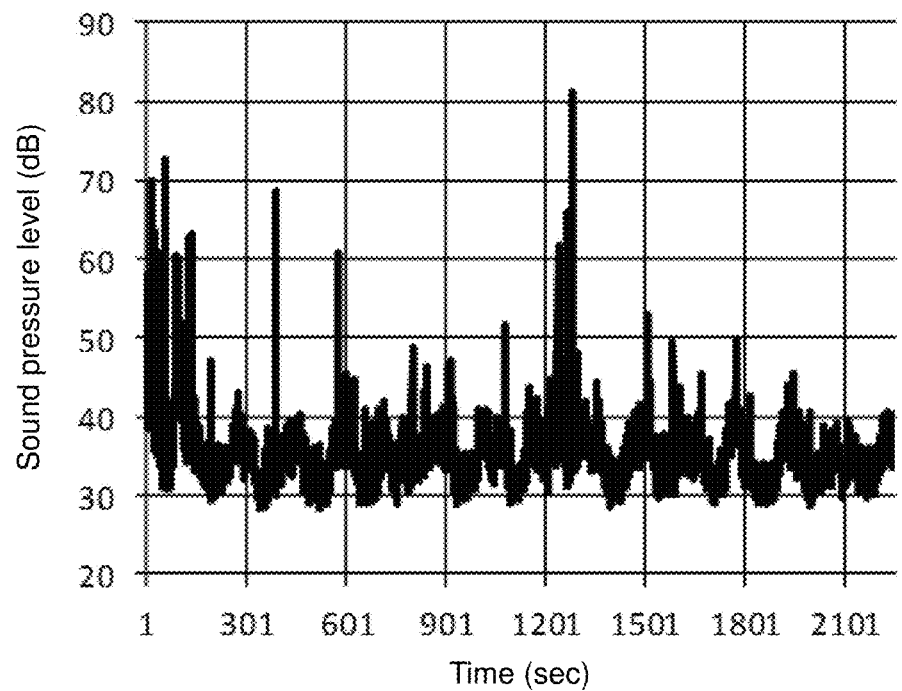
FIGS. 8A and 8B are graphs showing example sensing data to be sorted by the background noise data generation unit 212.
Figure 8B:
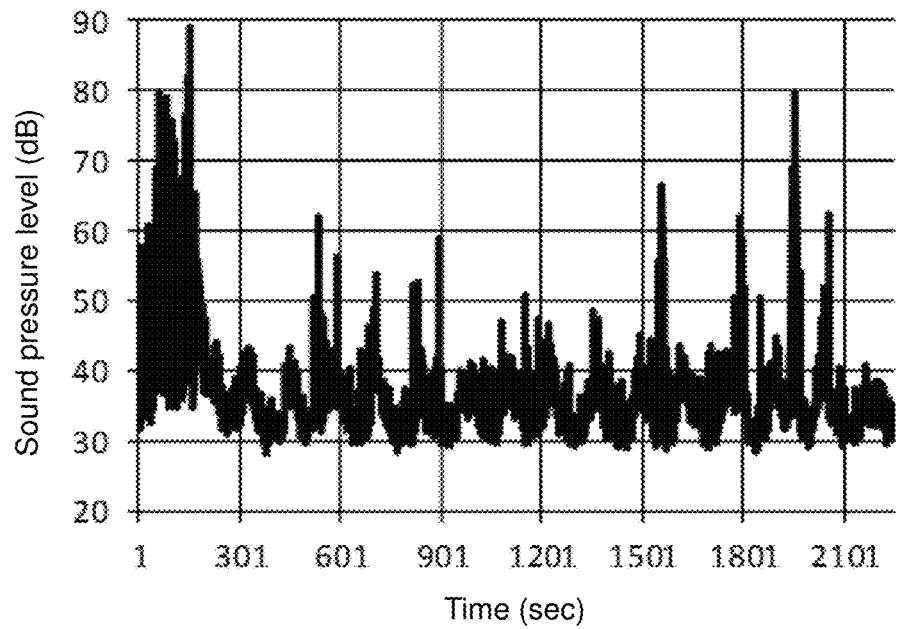

FIGS. 8A and 8B show example sensing data pieces to be sorted by the background noise data generation unit 212. FIGS. 8A and 8B show example sensing data pieces obtained by sensing sound pressure. In FIGS. 8A and 8B, the vertical axis indicates the sound pressure level, and the horizontal axis indicates the time at which the sound pressure level is measured. The sensing data pieces in FIGS. 8A and 8B differ from each other in their sound pressure levels with noticeable behaviors but are similar in their background noise.

Figure 9:
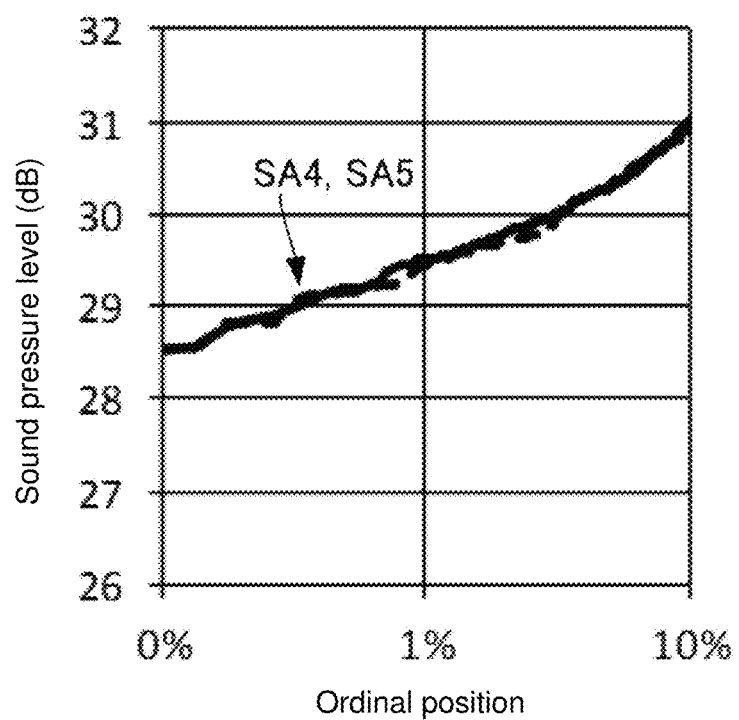
FIG. 9 is a graph showing sorted arrays obtained by sorting sensing data in ascending order.

FIG. 9 is a graph showing sorted arrays obtained by sorting the sensing data pieces in ascending order. In FIG. 9, the vertical axis indicates the sound pressure level (values of elements of a sorted array), and the horizontal axis indicates the position of each element of a sorted array. The graph in FIG. 9 uses a logarithmic scale for the horizontal axis. The sorted arrays SA4 and SA5 in FIG. 9 are respectively obtained by sorting the sensing data pieces shown in FIGS. 8A and 8B. The sorted arrays SA4 and SA5 include substantially the same segments representing background noise when compared with each other.

As shown in FIGS. 8A, 8B, and 9, the sorted arrays include substantially the same segments representing background noise, although their sensing data signals have different signal patterns. In other words, the segments of the sorted arrays representing background noise remain substantially unchanged although the sensing data signals have different signal patterns. Thus, sorting the sensing data pieces enables the signals representing background noise to be extracted accurately without being affected by the noticeable behaviors of the sensing data signals.

The background noise data generation unit 212 extracts elements from the segment representing background noise in each sorted array, and generates background noise data (s3). For example, background noise data in each sorted array is a set of a first element value (the smallest value of N sensing data pieces), an element value at 1%, and an element value at 10%. For example, the first elements of the sorted arrays SA1, SA2, and SA3 shown in FIG. 7C are respectively 28.9 dB, 27.7 dB, and 26.6 dB. The values of the respective elements at 1% are 29.7 dB, 28.3 dB, and 27.1 dB. The values of the respective elements at 10% are 31.6 dB, 29.0 dB, and 27.7 dB.

Figure 10A:
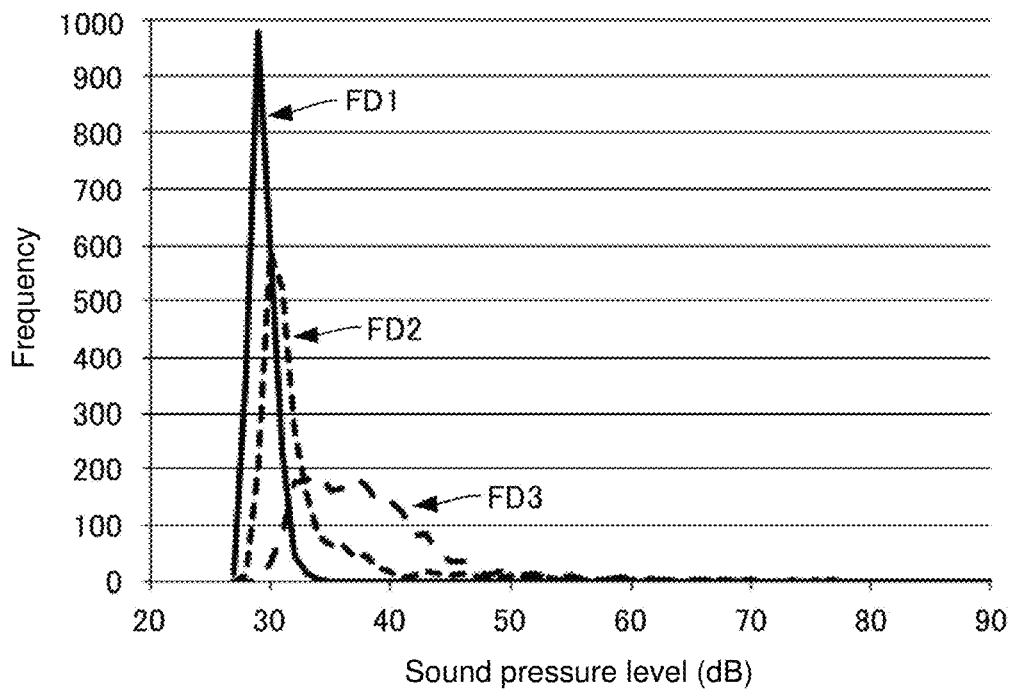
FIGS. 10A and 10B are graphs showing the frequency distributions of sensing data.
Figure 10B:
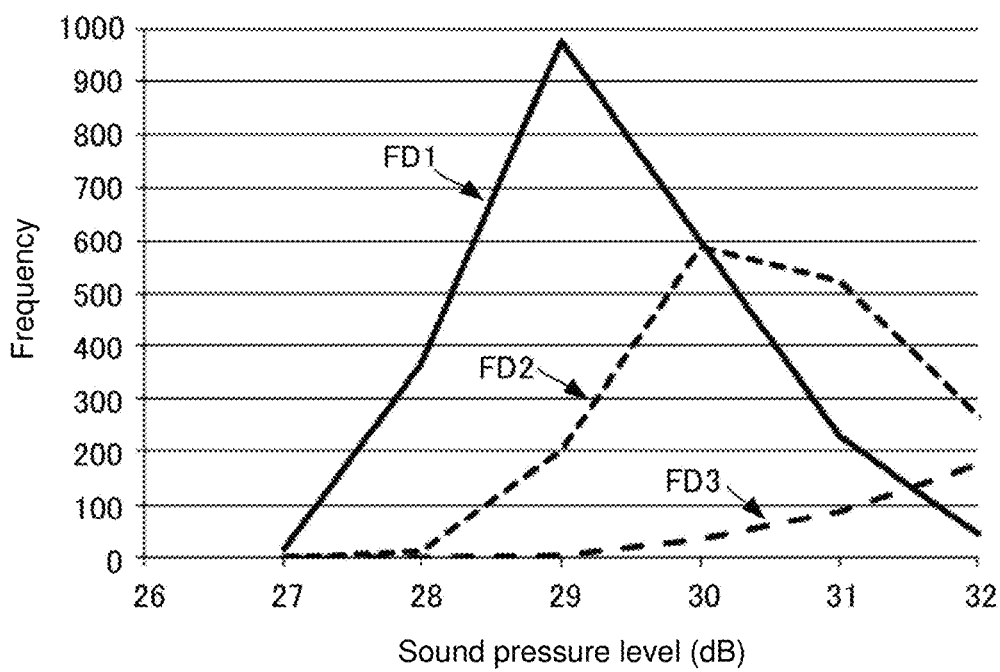

The background noise data generation unit 212 may generate background noise data based on the frequency distribution of sensing data. In this case, the background noise data corresponds to the frequency associated with the segment representing background noise in the frequency distribution of the sensing data. FIGS. 10A and 10B are example frequency distributions of sensing data. FIG. 10B is a graph showing the segment representing background noise in the frequency distribution of sensing data shown in FIG. 10A. In FIGS. 10A and 10B, the vertical axis indicates frequency. More specifically, the vertical axis indicates the number of sensing data pieces falling within the sections defined at intervals of 1 dB. For example, the number of sensing data pieces falling within the section ranging from 27.5 dB inclusive to 28.5 dB exclusive is about 360. The horizontal axis indicates the sound pressure level. In FIGS. 10A and 10B, the frequency distributions FD1, FD2, and FD3 are respectively obtained from the sensing data pieces shown in FIGS. 6A, 6B, and 6C. For example, background noise data corresponds to the frequency of each section with sound pressure levels ranging from 27.5 inclusive to 28.5 dB exclusive.

Generating background noise data based on each sorted array has the advantages described below over generating background noise data based on the frequency of sensing data. First, the ordinal position of each sensing data piece can be expressed in percentage. Second, unlike when background noise data is generated based on the frequency of sensing data, the background noise data can be generated based on each sorted array without defining sections, thus with less discretion.

Figure 11:
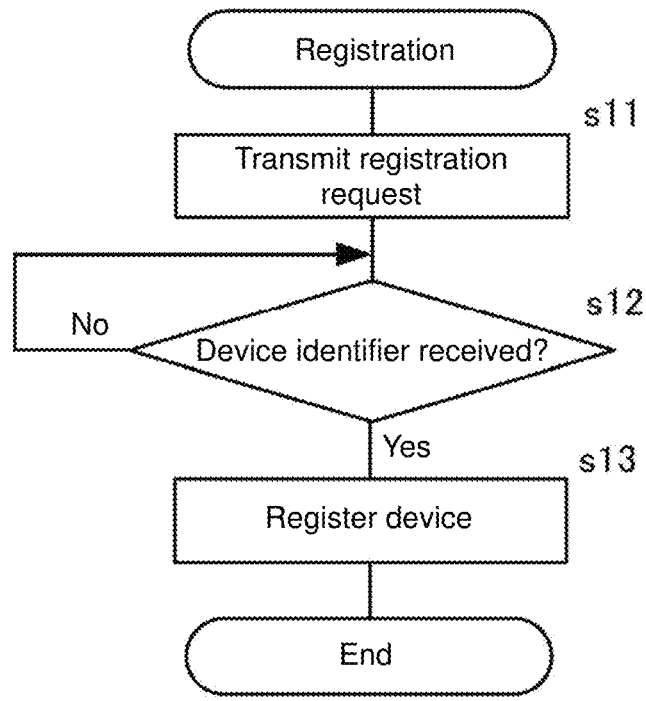
FIG. 11 is a flowchart showing a process for registering the sensor device 2 performed by the GW terminal 1.

The operation of the GW terminal 1 will be described below. A process for registering the sensor device 2 performed by the GW terminal 1 will be described first. FIG. 11 is a flowchart showing the process for registering the sensor device 2 performed by the GW terminal 1 according to this embodiment.

In the GW terminal 1, the sensor device registration unit 111 transmits a registration request to the sensor device 2 connected to the sensor device connection unit 12 (s11). When receiving the registration request transmitted from the GW terminal 1, the sensor device 2 transmits its device identifier to the GW terminal 1.

When receiving the device identifier transmitted from the sensor device 2 (s12), the sensor device registration unit 111 performs device registration, or stores the received device identifier into a memory (s13), and ends the process.

When the sensor device 2 stores a template for the provider data catalog 100, the sensor device registration unit 111 may obtain the template for the provider data catalog 100 from the sensor device 2 through the registration process described above. In this case, the sensor device registration unit 111 stores the obtained template for the provider data catalog 100 into the template storage DB 15 in a manner associated with the device identifier. When the sensor device 2 stores an address of a website storing a template for the provider data catalog 100 on the Internet, the sensor device registration unit 111 may obtain the address, access the website at the address, and obtain the template for the provider data catalog 100.

Figure 12:
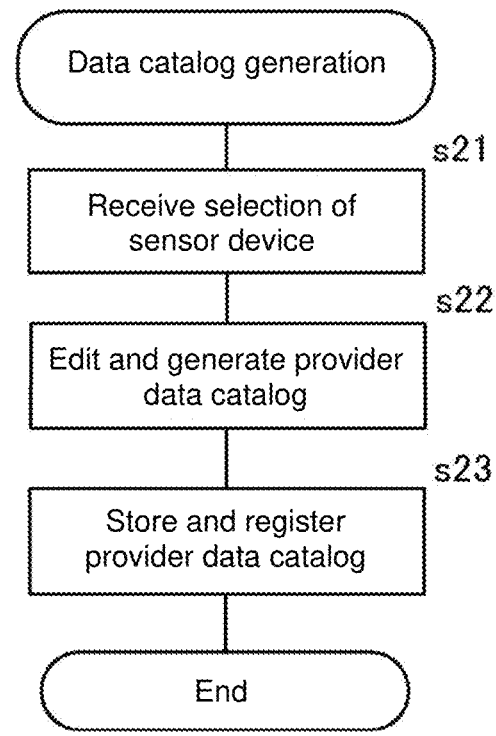
FIG. 12 is a flowchart showing a process for generating the provider data catalog 100 performed by the GW terminal 1.

A process for generating the provider data catalog 100 performed by the GW terminal 1 will now be described. FIG. 12 is a flowchart showing the process for generating the provider data catalog 100 performed by the GW terminal 1 according to this embodiment. The GW terminal 1 receives selection of a sensor device 2 for which the provider data catalog 100 is to be generated (s21). The operator operates the operation unit 13 of the GW terminal 1, and selects a sensor device 2 for which the provider data catalog 100 is to be generated. For example, the GW terminal 1 shows, on the display, the device identifiers of the registered sensor devices 2. The operator selects a sensor device 2 for which the provider data catalog 100 is to be generated from the sensor devices 2 with the device identifiers on the display.

Figure 13A:
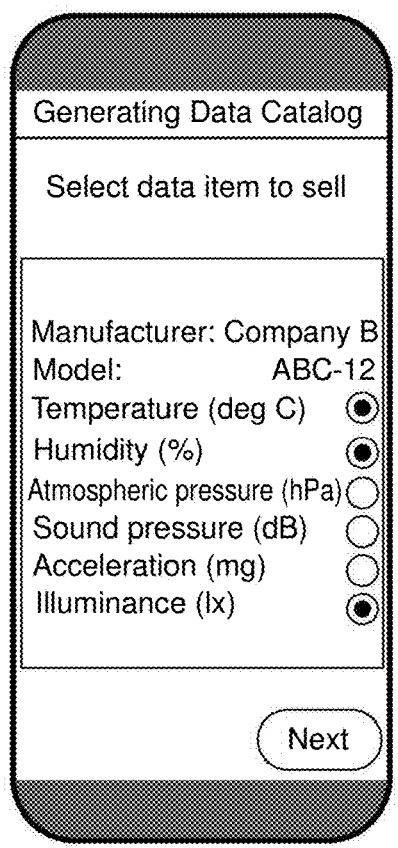
FIGS. 13A and 13B are diagrams of example screens for editing the provider data catalog 100 performed by the GW terminal 1.

The data catalog generation unit 113 edits and generates the provider data catalog 100 for the sensor device 2 selected in s21 (s22). In the GW terminal 1, the operation unit 13 receives an edit associated with selection of sensing data items to sell in the SDTM in s22. For example, when the sensor device 2 is an environmental sensor that outputs six sensing data items including atmospheric temperature, humidity, atmospheric pressure, sound pressure, acceleration, and illuminance, the GW terminal 1 receives, for each of these items, selection to sell or not to sell the item in the SDTM (refer to FIG. 13A). In FIG. 13A, items with a check on their right (atmospheric temperature, humidity, and illuminance in FIG. 13A) are the items selected to sell in the SDTM (unchecked items are selected not to sell in the SDTM).

Figure 13B:
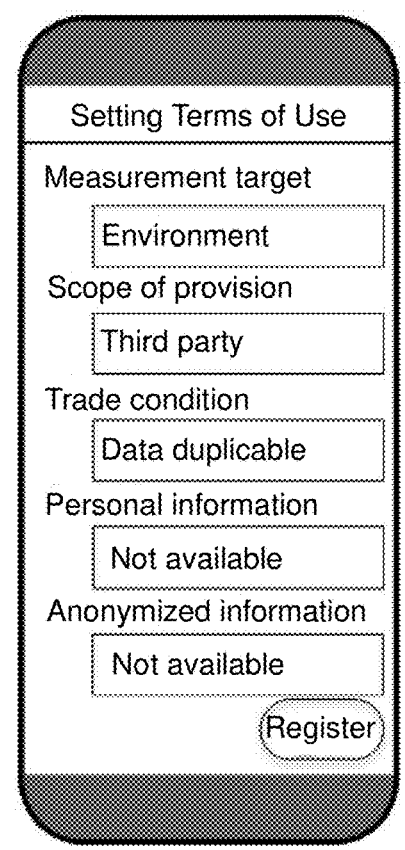

In the GW terminal 1, the operation unit 13 also receives an edit to items included in the provider data catalog 100 (including items yet to be described) (refer to FIG. 13B). FIG. 13B is a diagram of an example screen on the GW terminal 1 receiving an edit to a measurement target, a scope, a trade condition, personal information, and anonymized information. In s22, the GW terminal 1 also receives an edit to other attributes that are not shown in FIG. 13B.

The data catalog generation unit 113 receives an instruction to complete an edit from the operator, and generates the provider data catalog 100 reflecting the edit by the operator.

When a determination result for sensing data reliability can be obtained, the data catalog generation unit 113 may generate the provider data catalog 100 reflecting the determination result. For example, the data catalog generation unit 113 may request the reliability determination unit 116 to determine the reliability of sensing data, or may search a database storing determination results for sensing data reliability.

The data catalog generation unit 113 stores the provider data catalog 100 generated in s22 into the data catalog storage DB 16, and transmits the provider data catalog 100 to the sensor network server 3 for registration (s23).

Figure 14:
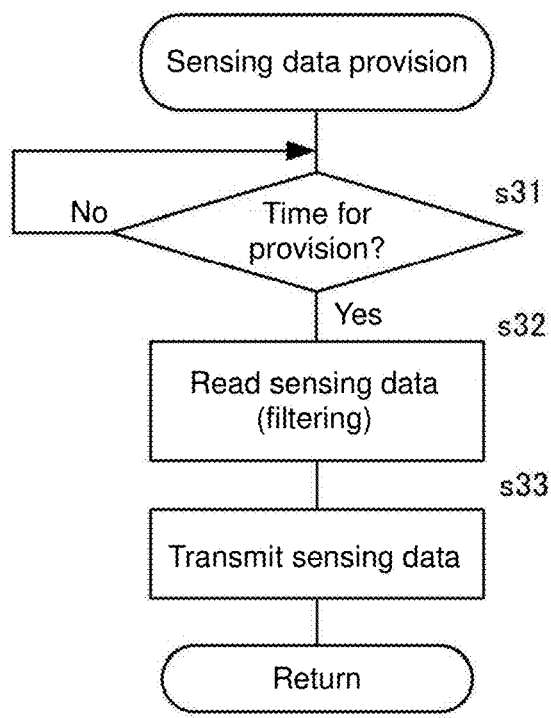
FIG. 14 is a flowchart showing a process for providing sensing data.

A process for providing sensing data performed by the GW terminal 1 will now be described. FIG. 14 is a flowchart showing the process for providing sensing data according to this embodiment. When detecting the time at which sensing data is to be provided to the application system 4, the sensing data output limit unit 114 in the GW terminal 1 reads sensing data to be provided from the sensing data storage DB 17 based on the provider data catalog 100 associated with the sensing data to be provided (s31 and s32). In s32, sensing data with measurement characteristics selected for provision to the provider data catalog 100 is read, whereas sensing data with measurement characteristics unselected for provision is not read. More specifically, in s32, filtering is performed to read no sensing data with measurement characteristics unselected for provision to the provider data catalog 100 from the sensing data storage DB 17. The sensing data output limit unit 114 transmits the filtered sensing data to the application system 4 (s33). The GW terminal 1 repeats the processing in s31 through s33.

Figure 15:
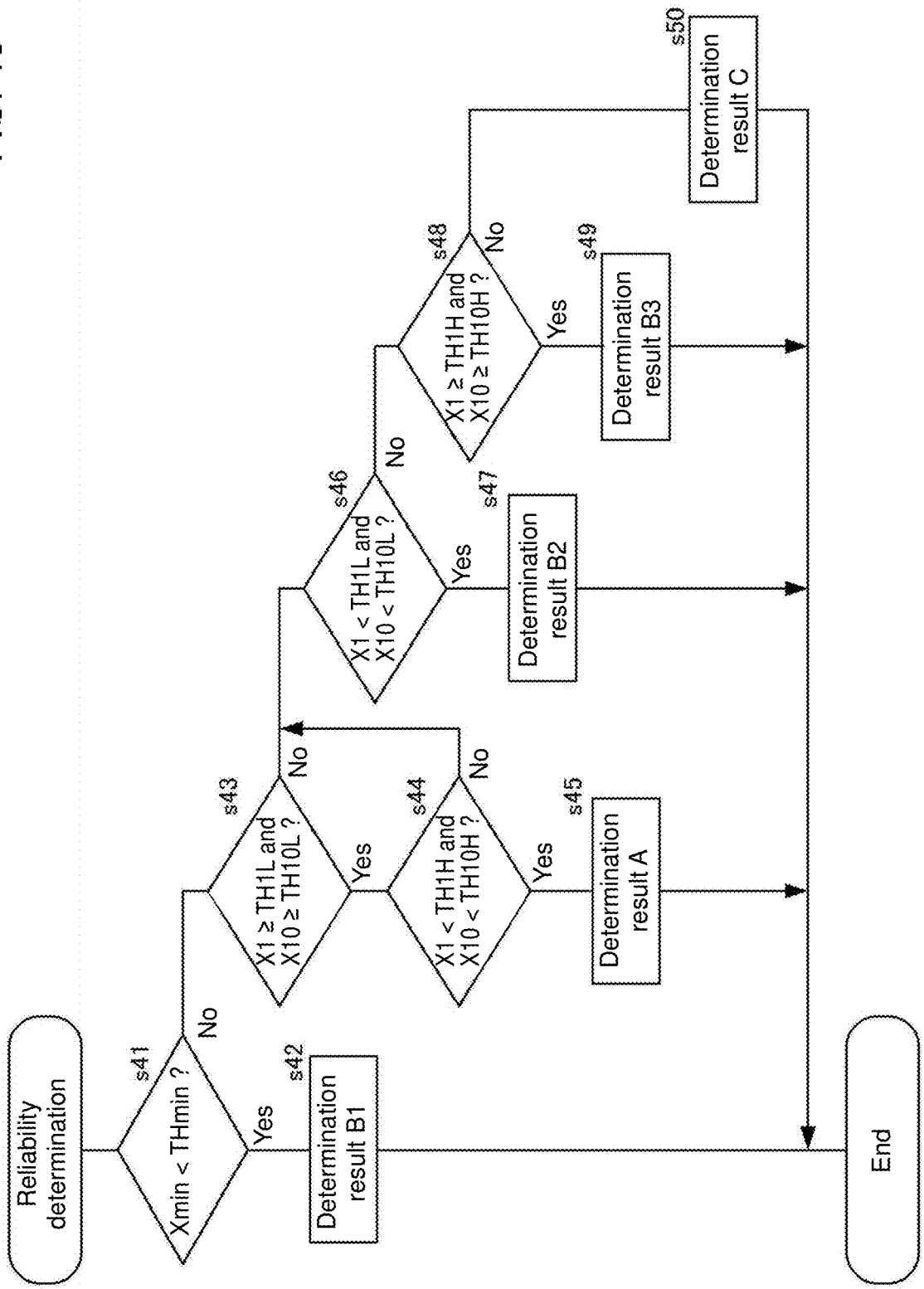
FIG. 15 is a flowchart showing a process for determining sensing data reliability performed by the GW terminal 1.

A process for determining the reliability of sensing data performed by the GW terminal 1 will now be described. FIG. 15 is a flowchart showing the process for determining the reliability of sensing data performed by the GW terminal 1 according to this embodiment. In this embodiment, the reliability determination unit 116 determines the reliability of sensing data using background noise data including a first element value, an element value at 1%, and an element value at 10% in each sorted array described above. Hereafter, a first element value of each sorted array as a component of background noise data is referred to as a feature parameter Xmin. An element value at 1% in each sorted array as a component of background noise data is referred to as a feature parameter X1. An element value at 10% in each sorted array as a component of background noise data is referred to as a feature parameter X10.

When the feature parameter Xmin is less than a threshold THmin (Yes in s41), the reliability determination unit 116 determines that the reliability of sensing data is B1 (s42). The threshold THmin is set to a minimum value output as sensing data by the sensor unit 22 in the sensor device 2 operating normally. The determination result B1 indicates that the background noise is far less than usual. Sensing data with the determination result B1 has low reliability. When the determination result B1 is obtained, for example, the sensor unit 22 in the sensor device 2 is likely to be faulty and be operating abnormally.

When the feature parameter Xmin is not less than the threshold THmin, the feature parameter X1 is not less than a threshold TH1L and less than a threshold TH1H, and the feature parameter X10 is not less than a threshold TH10L and less than a threshold TH10H (No in s41, Yes in s43, and Yes in s44), the reliability determination unit 116 determines that the reliability of sensing data is A (s45). The determination result A indicates that the background noise is substantially the same as usual. Sensing data with the determination result A has high reliability. When the determination result A is obtained, the sensor device 2 is likely to be in a normal state.

The thresholds TH1L, TH1H, TH10L, and TH10H may be determined based on sensing data sensed when the sensor device 2 is installed. The thresholds TH1L, TH1H, TH10L, and TH10H may be determined based on background noise data obtained in the past. For example, the thresholds TH1L, TH1H, TH10L, and TH10H may be determined to cause the sensing data piece shown in FIG. 6A to receive the determination result B3 described below, and the sensing data pieces shown in FIGS. 6B and 6C to each receive the determination result B2 described below.

When the feature parameter X1 is less than the threshold TH1L, and the feature parameter X10 is less than the threshold TH10L (No in s43 and Yes in s46, or No in s44 and Yes in s46), the reliability determination unit 116 determines that the reliability of sensing data is B2 (s47). The determination result B2 indicates that the background noise is smaller than usual. Sensing data with the determination result B2 has low reliability. When the determination result B2 is obtained, for example, the sensor unit 22 in the sensor device 2 is likely to be covered, or the sensor device 2 is likely to have dropped from its installation position.

When the feature parameter X1 is greater than or equal to the threshold TH1H, and the feature parameter X10 is greater than or equal to the threshold TH10H (No in s46 and Yes in s48), the reliability determination unit 116 determines that the reliability of sensing data is B3 (s49). The determination result B3 indicates that the background noise is greater than usual. Sensing data with the determination result B3 has low reliability. When the determination result B3 is obtained, for example, the sensor device 2 is likely to be faulty and be causing internal noise, sensing a measurement target is likely to be prevented, or the sensor device 2 is likely to have dropped from its installation position.

When the feature parameters Xmin, X1, and X10 satisfy none of the conditions described above (No in s48), the reliability determination unit 116 determines that the reliability of sensing data is C (s50). The determination result C indicates that the background noise shows unusual behavior. Sensing data with the determination result C has low reliability.

When background noise data includes the frequency of sensing data as described above, the reliability determination unit 116 may determine the sensing data reliability by comparing the frequency of the sensing data included in the background noise data with a threshold determined as appropriate.

In this embodiment, background noise data reflecting background noise is generated based on sensing data as described above. Then, the reliability of the sensing data is determined using the background noise data. The determination result for sensing data reliability is thus provided to the user.

In the above embodiment, background noise data is sound data. However, background noise data is not limited to sound data, but may be data other than sound data, such as image data. For example, when the background noise data is image data, the background noise data may be image data for an object that is being captured over a relatively long time.

Figure 16:
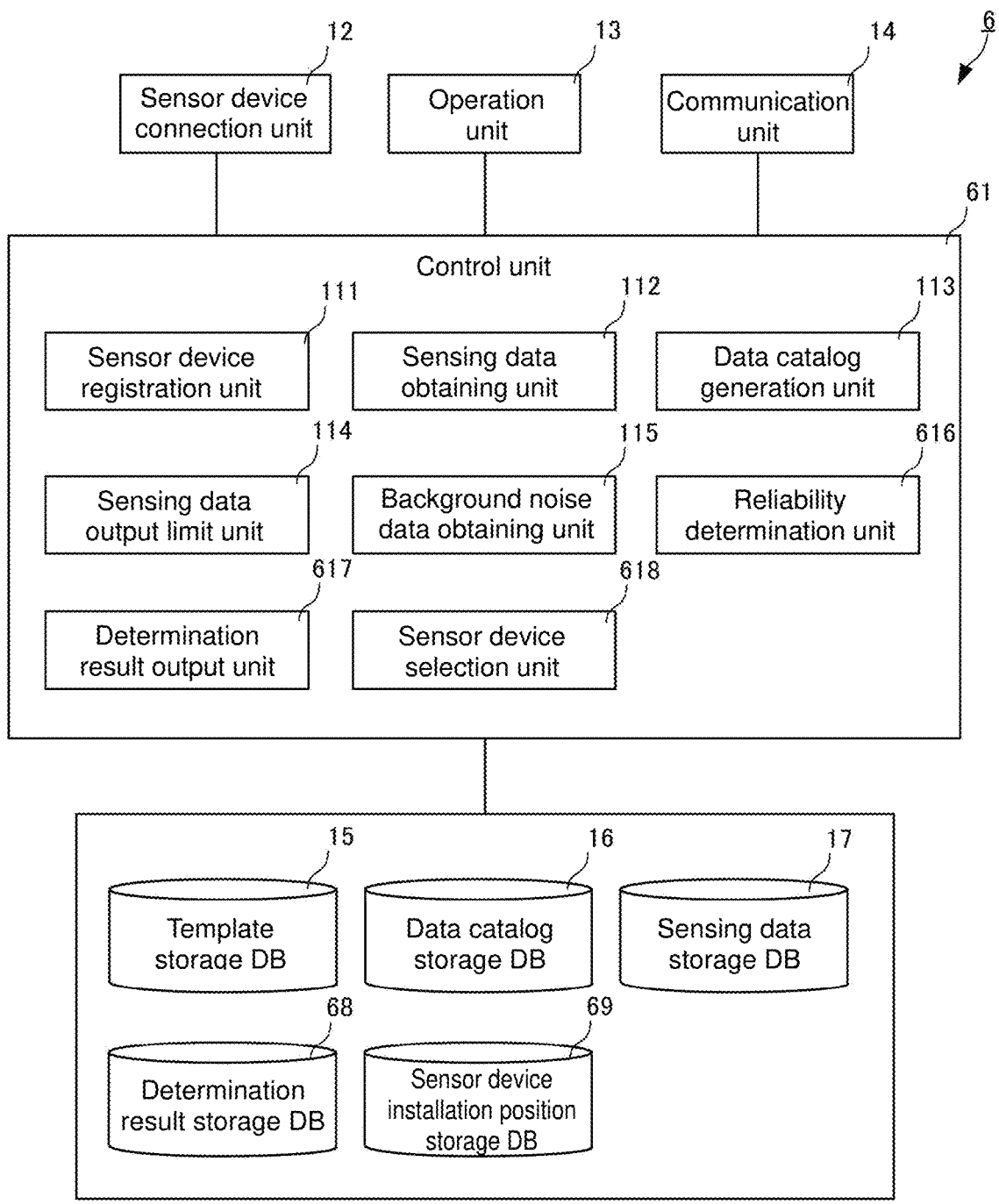
FIG. 16 is a block diagram of a GW terminal 6 showing its main components.

A GW terminal 6 according to a modification will now be described. FIG. 16 is a block diagram of the GW terminal 6 showing its main components. The GW terminal 6 includes a control unit 61, a determination result storage database 68 (determination result storage DB 68), and a sensor device installation position storage database 69 (sensor device installation position storage DB 69). The control unit 61 includes a reliability determination unit 616, a determination result output unit 617, and a sensor device selection unit 618.

The determination result storage DB 68 stores the determination results for sensing data reliability. The sensor device installation position storage DB 69 stores sensor device installation position data associated with the installation position of the sensor device 2.

The reliability determination unit 616 determines the reliability of sensing data as a determination target by comparing background noise data associated with the sensing data as the determination target obtained through sensing by a sensor device 2a with background noise data associated with sensing data to be obtained through sensing by another sensor device 2b different from the sensor device 2a. In addition to the operation of the determination result output unit 117 described above, the determination result output unit 617 stores the results of determination of sensing data reliability in the determination result storage DB 68. The sensor device selection unit 618 selects a sensor device near the sensor device 2a as the sensor device 2b based on sensor device installation position data.

Figure 17:
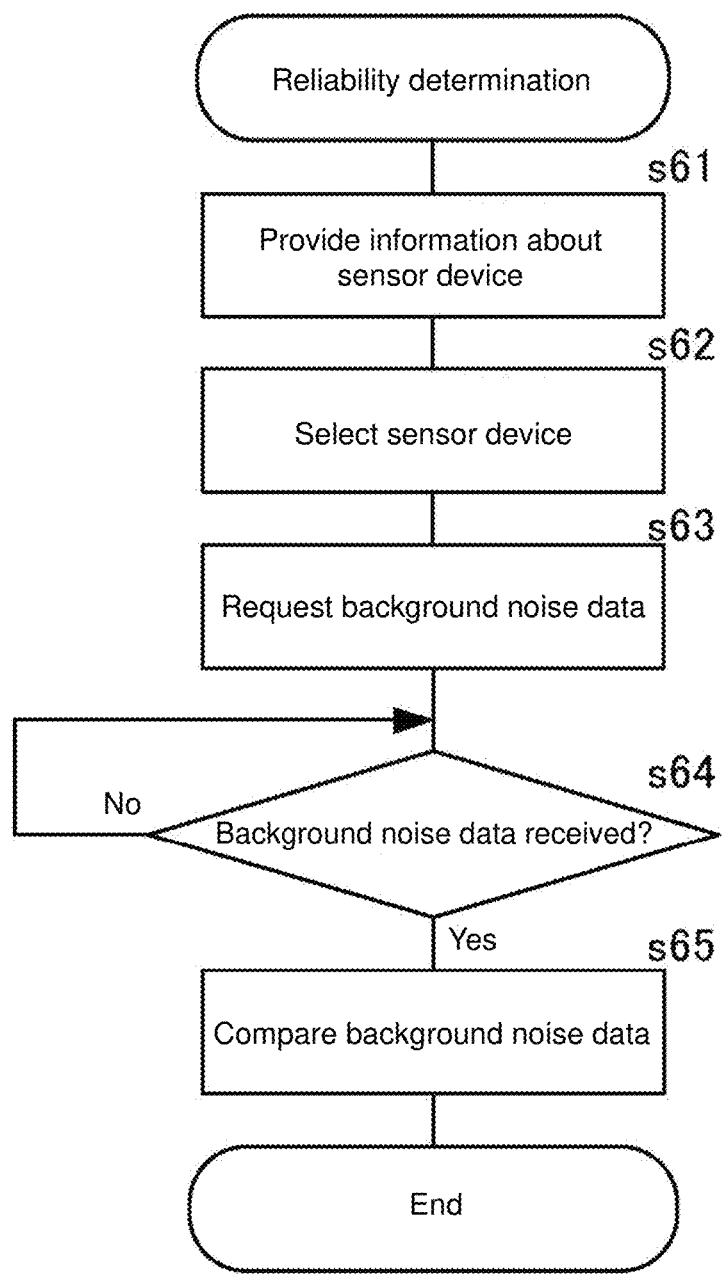
FIG. 17 is a flowchart showing a process for determining sensing data reliability performed by the GW terminal 6.

A process for determining sensing data reliability performed by the GW terminal 6 will now be described. FIG. 17 is a flowchart showing the process for determining sensing data reliability performed by the GW terminal 6.

The reliability determination unit 616 provides, to the sensor device selection unit 618, information about the sensor device 2a associated with sensing data as a determination target and the measurement characteristics for a measurement target (s61). The sensing data as the determination target is associated with background noise obtained by the background noise data obtaining unit 115.

The sensor device selection unit 618 senses the specified measurement characteristics for the measurement target, and selects a sensor device located near the notified sensor device 2a and operating normally as the sensor device 2b (s62).

For example, the sensor device selection unit 618 refers to the sensing data targets listed in the provider data catalog 100, and determines whether the two sensor devices 2 sense the measurement characteristics for the same measurement target. The sensor device selection unit 618 calculates the distance between the two sensor devices 2 based on sensor device installation position data stored in the sensor device installation position storage DB 69. The sensor device selection unit 618 then determines that the two sensor devices 2 are in close proximity to each other when the calculated distance between the two sensor devices 2 is shorter than a threshold. The sensor device selection unit 618 refers to the determination results of sensing data reliability stored in the determination result storage DB 68, and determines whether the sensor devices 2 operate normally. The sensor device selection unit 618 determines that the sensor device 2 operates normally when the sensor device 2 has output reliable sensing data for a predetermined past period up to the present time.

The reliability determination unit 616 requests the sensor device 2b selected by the sensor device selection unit 618 to provide background noise data corresponding to background noise data associated with sensing data as a determination target (s63). When receiving the background noise data from the sensor device 2b (s64), the reliability determination unit 616 performs the process shown in FIG. 15 to determine the reliability of the sensing data as a determination target (s65).

In this modification, the feature parameters Xmin, X1, and X10 refer to background noise data associated with sensing data obtained by the sensor device 2a. The threshold THmin is set to a minimum value output as sensing data by the sensor unit 22 in the sensor device 2a operating normally. The reliability determination unit 616 determines the thresholds TH1L, TH1H, TH10L, and TH10H based on background noise data associated with the sensor device 2b. For example, the reliability determination unit 616 determines the thresholds TH1L, TH1H, TH10L, and TH10H using feature parameters Y1 and Y10 included in background noise data in the formulas below:

$$TH1L = Y1 - \alpha;$$

$$TH1N = Y1 + \alpha;$$

$$TH10L = Y10 - \alpha; \text{ and}$$

$$TH10H = Y10 + \alpha,$$

where the feature parameter Y1 herein refers to an element value at 1% in a sorted array associated with the sensor device 2b. The feature parameter Y10 refers to an element value at 10% in the sorted array associated with the sensor device 2b. The condition $\alpha > 0$ is defined as appropriate.

The present invention is not limited to the above embodiments, but the components may be modified without departing from the spirit and scope of the invention in its implementation. The components described in the above embodiments may be combined as appropriate to provide various aspects of the invention. For example, some of the components described in the above embodiments may be eliminated. Further, components in different embodiments may be combined as appropriate.

The above embodiments may be partially or entirely expressed in, but not limited to, the following forms shown in the appendixes below.

APPENDIX 1

A sensor device, comprising:
at least one hardware processor configured to
obtain sensing data; and
generate background noise data reflecting background noise based on the obtained sensing data.

APPENDIX 2

A method for generating background noise data implementable by at least one hardware processor, the method comprising:
obtaining sensing data; and generating background noise data reflecting background noise based on the obtained sensing data.

REFERENCE SIGNS LIST 1, 6 gateway terminal (GW terminal)
2, 2a, 2b sensor device
3 sensor network server
4 application system
5 network
11, 21, 61 control unit
12 sensor device connection unit
13 operation unit
14 communication unit
15 template storage database (template storage DB)
16 data catalog storage database (data catalog storage DB)
17 sensing data storage database (sensing data storage DB)
22 sensor unit
23 gateway connection unit (GW connection unit)
24 sensing data storage
25 device information storage
68 determination result storage database (determination result storage DB)
69 sensor device installation position storage database (sensor device installation position storage DB)
100 provider data catalog (provider DC)
101 user data catalog (user DC)
111 sensor device registration unit
112 sensing data obtaining unit
113 data catalog generation unit
114 sensing data output limit unit
115 background noise data obtaining unit
116, 616 reliability determination unit
117, 617 determination result output unit
211 sensing data management unit
212 background noise data generation unit
618 sensor device selection unit

The invention claimed is:

1. A sensor device for transmitting, to an external device installed external to the sensor device, sensing data generated from monitoring a target, the sensor device comprising:
a sensor unit configured to generate sensing data including background noise data, the background noise data representing noise from a cause other than the target;
an extraction unit configured to extract the background noise data from the sensing data by sorting the items of sensing data generated at a plurality of times into sorted arrays of element values based on values indicated by the items of sensing data, the background noise data comprising the sensing data in the sorted arrays whose sort order is equal to a predetermined order; and
a transmission unit configured to transmit the sensing data and configured to transmit the extracted background noise data to the external device separately from transmitting the sensing data, wherein
the background noise indicates a reliability of the sensor device;
the background noise is generated in response to a request,
the sorted arrays include same segments representing the background noise, and the sensing data for the sorted arrays includes different signal patterns, and
the reliability of the sensing data of the sensor device and the state of the sensor device are determined based on the element values of the transmitted extracted background noise using the same segments in the sorted arrays.

2. The sensor device according to claim 1, further comprising:
a storage configured to store items of sensing data generated at a plurality of times,
wherein the transmission unit is configured to collectively transmit the items of sensing data stored in the storage to the external device.

3. A method for transmitting background noise data implementable by a computer, the method comprising:
obtaining sensing data generated from monitoring a target, the sensing data including background noise data representing noise from a cause other than the target;
extracting the background noise data from the sensing data by sorting the items of sensing data generated at a plurality of times into sorted arrays of element values based on values indicated by the items of sensing data, the background noise data comprising the sensing data in the sorted arrays whose sort order is equal to a predetermined order;
transmitting the sensing data; and
transmitting the extracted background noise data separately from transmitting the sensing data; wherein:
the background noise indicates a reliability of the sensor device;
the background noise is generated in response to a request; and
the sorted arrays include same segments representing the background noise, and the sensing data for the sorted arrays includes different signal patterns; and
the reliability of the sensing data of the sensor device and the state of the sensor device are determined based on the element values of the transmitted extracted background noise using the same segments in the sorted arrays.

4. A non-transitory computer-readable medium storing a program for transmitting background noise data, the program causing a computer to perform operations comprising:
obtaining sensing data generated from monitoring a target, the sensing data including background noise data representing noise from a cause other than the target;
extracting the background noise data from the sensing data by sorting the items of sensing data generated at a plurality of times into sorted arrays of element values based on values indicated by the items of sensing data, the background noise data comprising the sensing data in the sorted arrays whose sort order is equal to a predetermined order;
transmitting the sensing data; and
transmitting the extracted background noise data separately from transmitting the sensing data; wherein:
the background noise indicates a reliability of the sensor device;
the background noise is generated in response to a request; and
the sorted arrays include same segments representing the background noise, and the sensing data for the sorted arrays include different signal patterns; and
the reliability of the sensing data of the sensor device and the state of the sensor device are determined based on the element values of the transmitted extracted background noise using the same segments in the sorted arrays.

* * * * *